(12) United States Patent
Sol

(10) Patent No.: US 11,142,070 B2
(45) Date of Patent: Oct. 12, 2021

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Unhwan Sol, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 303 days.

(21) Appl. No.: 16/413,061

(22) Filed: May 15, 2019

(65) Prior Publication Data
US 2020/0171948 A1   Jun. 4, 2020

(30) Foreign Application Priority Data
Nov. 29, 2018   (KR) .................... 10-2018-0150447

(51) Int. Cl.
*B60K 35/00* (2006.01)
*G01S 5/00* (2006.01)

(52) U.S. Cl.
CPC ............ *B60K 35/00* (2013.01); *G01S 5/0045* (2013.01); *B60K 2370/1438* (2019.05); *B60K 2370/164* (2019.05); *B60K 2370/165* (2019.05); *B60K 2370/166* (2019.05); *B60K 2370/569* (2019.05); *B60K 2370/589* (2019.05)

(58) Field of Classification Search
None
See application file for complete search history.

(56) References Cited

U.S. PATENT DOCUMENTS

| 8,666,523 B2 * | 3/2014 | Kim ...................... G06F 3/0482 700/90 |
| 2012/0120930 A1 * | 5/2012 | Ji ........................ H04L 12/2825 370/338 |

FOREIGN PATENT DOCUMENTS

JP   2009282778 A   * 12/2009

OTHER PUBLICATIONS

Machine Translation of JP-2009282778 (Year: 2009).*

* cited by examiner

*Primary Examiner* — Navid Ziaeianmehdizadeh
(74) *Attorney, Agent, or Firm* — McDonnell Boehnen Hulbert & Berghoff LLP

(57) ABSTRACT

Provided is a vehicle including a vehicle communicator configured to receive image information of a home device and position information derived on the basis of a signal transmitted by the home device, a display configured to display an image on the basis of the image information, and a vehicle controller configured to identify a selection area of the home device on the image on the basis of the image information and the position information, wherein the display shows the identified selection area.

19 Claims, 11 Drawing Sheets

VEHICLE AND METHOD OF CONTROLLING THE SAME

CROSS REFERENCE TO RELATED APPLICATION

This application is based on and claims priority under 35 U.S.C. § 119 to Korean Patent Application No. 10-2018-0150447, filed on Nov. 29, 2018 in the Korean Intellectual Property Office, the disclosure of which is incorporated herein by reference.

BACKGROUND

1. Field

The present disclosure relates to a vehicle and a method of controlling the same.

2. Description of the Related Art

Vehicles not only have basic driving functions, but also have additional functions for user convenience, such as audio function, video function, navigation function, air conditioning control, seat control, lighting control, and the like.

As a multimedia system for a vehicle to perform the above described functions, an Audio Video Navigation Head Unit (hereinafter, referred to as an AVN head unit) in which an audio device, a video device, a navigation device, and the like are integrated to form a single system is provided in a vehicle to provide an audio service such as a radio, CD (Compact Disk), and the like, a video service, such as a digital versatile disk (DVD), and a navigation service, such as a destination guidance function.

With development of vehicle IT technologies there has recently been research on the connectivity technology that the AVN head unit provides a variety of services in conjunction with external devices. Representative examples of the connectivity technology include hands-free calling, music playback, and video playback through Bluetooth connection with an external device, such as a smart phone.

SUMMARY

Therefore, it is an object of the present disclosure to provide a vehicle capable of controlling a home device existing in a real space, such as home or a workplace, using image information obtained by an imaging device, and a method of controlling the same.

Additional aspects of the disclosure will be set forth in part in the description which follows and, in part, will be obvious from the description, or may be learned by practice of the disclosure.

Therefore, it is an aspect of the present disclosure to provide a vehicle including: a vehicle communicator configured to receive image information of a home device and position information derived on the basis of a signal transmitted by the home device; a display configured to display an image on the basis of the image information; and a vehicle controller configured to identify a selection area of the home device in the image on the basis of the image information and the position information, wherein the display displays the identified selection area.

The vehicle communicator may receive image information about a space image.

The vehicle controller may control the display to display a partial image of the space image.

The vehicle may further include an inputter configured to receive a designation of the partial image of the space image from a user.

The inputter may include a touch panel, and receives a designation of the partial image through a touch input.

The vehicle communicator may receive signal strength information and phase information of the home device as the position information, and the vehicle controller may determine a position of the home device on the basis of the signal strength information and the phase information.

The vehicle controller may determine a phase at a point in which the home device has the greatest signal strength, to be a phase of the home device.

The vehicle controller may extract an edge boundary of the home device on the basis of the image information and generate a selection area including the edge boundary.

The vehicle controller may identify the home device in the image and match the identified home device and the position information.

The display may receive a touch input to receive a designation of the selection area from a user.

It is another aspect of the present disclosure to provide a method of controlling a vehicle, the method including: receiving image information of a home device and position information derived on the basis of a signal transmitted by the home device; displaying an image on the basis of the image information; and identifying a selection area of the home device in the image on the basis of the image information and the position information, wherein the displaying of the image includes displaying the identified selection area.

The receiving of the image information and the position information may include receiving image information about a space image.

The displaying of the image may include, before the displaying of the identified selection area, controlling a display to display a partial image of the space image.

The displaying of the image may include, before the controlling of the display, receiving a designation of the partial image of the space image from a user.

The receiving of the partial image may include receiving a designation of the partial image through a touch input on an inputter implemented as a touch panel.

The receiving of the image information and the position information may include receiving signal strength information and phase information of the home device as the position information, wherein the identifying of the selection area may include determining a position of the home device on the basis of the signal strength information and the phase information.

The determining of the position of the home device may include determining a phase at a point in which the home device has greatest signal strength, to be a phase of the home device.

The identifying of the selection area may include extracting an edge boundary of the home device on the basis of the image information and generating a selection area including the edge boundary.

The identifying of the selection area may include identifying the home device in the image and matching the identified home device and the position information.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
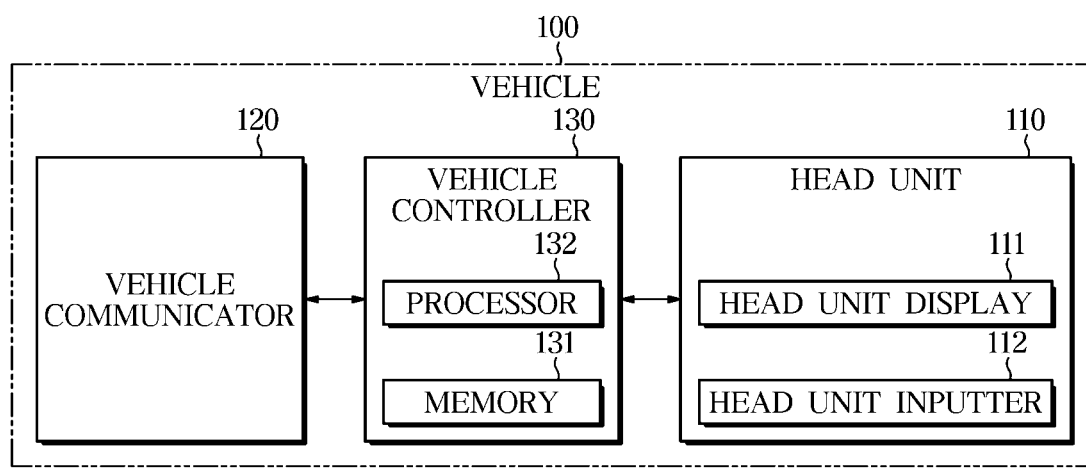
FIG. 1 is a control block diagram illustrating a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "part", "module", "member", "block", etc., may be implemented in software and/or hardware, and a plurality of "parts", "modules", "members", or "blocks" may be implemented in a single element, or a single "part", "module", "member", or "block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, identify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the disclosure will be described with reference to the accompanying drawings.

Figure 2:
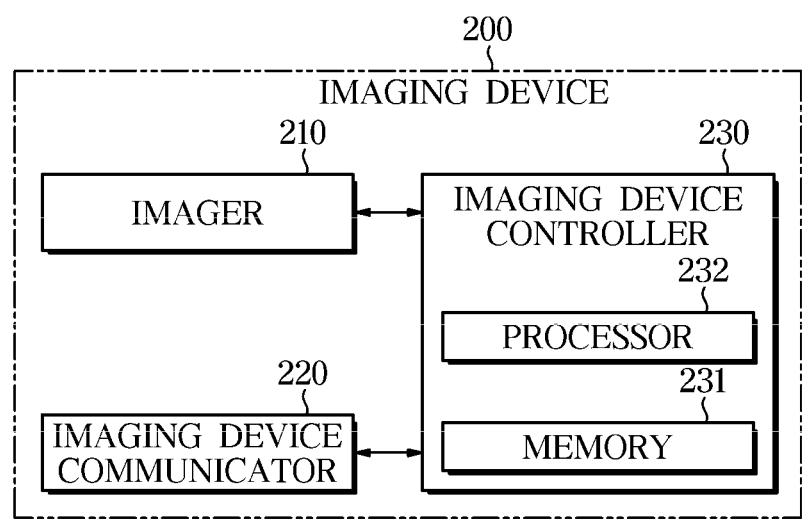
FIG. 2 is a control block diagram illustrating an imaging device according to an embodiment.

FIG. 1 is a control block diagram illustrating a vehicle according to an embodiment, and FIG. 2 is a control block diagram illustrating an imaging device according to an embodiment.

A vehicle 100 according to an embodiment is connected to an imaging device 200 through a wired/wireless communication network, to receive image information from the imaging device 200 that has captured an image of a home device, determine the position of the imaged home device on the basis of the received image information, and identify a section area of the home device in an image screen of the vehicle 100 being output.

A home device, as a device found in everyday life, is connected to a home network through a built-in communication module to transmit and receives data.

For example, the home devices include not only home appliances, such as display devices, air conditioners, refrigerators, cleaning robots, lighting appliances, wine refrigerators, washing machine, desktop computers, but also all types of wearable user terminals, such as smart phones, smart watches, and smart glasses.

In detail, the vehicle 100 according to the embodiment includes a head unit 110, a vehicle communicator 120, and a vehicle controller 130.

The head unit 110 is a multimedia system for a vehicle in which an audio device, a video device, a navigation device, and the like are integrated as a single system, and provides a user with a radio service for playing a radio program on the basis of a terrestrial radio signal, an audio service for playing a compact disk (CD), a video service for playing a digital versatile disk (DVD), a navigation service for providing a user with a destination guidance, and a telephone service for controlling whether a device connected to the vehicle receives. In addition, the head unit 110 may also provide a speech recognition service that provides the above described radio service, audio service, video service, navigation service, and telephone service by receiving a speech, rather than a user's manipulation.

The head unit 110 may be mounted on a dashboard (not shown) in the vehicle 100, or may be embedded in a center fascia (not shown).

The user may receive the radio service, the audio service, the video service, and the navigation service through the head unit 110.

Here, the head unit 110 may be referred to as a navigation terminal or a display device, and may be referred to as various other terms used by those skilled in the art.

In addition, the head unit 110 may perform Wi-Fi and Bluetooth pairing through a communicator 120, which will be described below, and may be connected to a user device, such as a smartphone, a portable multimedia player (PMP), a MPEG Audio Layer-3 (MP3) player, a personal digital assistant (PDA), and the like to play audio and video files.

The head unit 110 may include a head unit display 111 for outputting an image to a user and a head unit inputter 112 for receiving a user command.

The head unit display 111 may selectively display at least one of an audio screen, a video screen, and a navigation screen, as well various control screens or additional function screens related to the vehicle 100.

The head unit display 111 may be implemented as a liquid crystal display (LCD), a light emitting diode (LED), a plasma display panel (PDP), an organic light emitting diode (OLED), or a cathode ray tube (CRT).

The head unit inputter 112 may be provided in the form of a hard key in a position adjacent to the head unit display 111. When the head unit display 111 is implemented as a touch screen, the head unit inputter 112 may be provided in the form of a touch panel on a front surface of the head unit display 111.

In addition, the head unit inputter 112 may be provided in the form of a hard key, such as buttons or dials, in a position not adjacent to the head unit display 111, and may control an image displayed on the head unit display 111 according to a user command. For example, the head unit inputter 112 may be provided in the form of a jog shuttle between the driver's seat and the passenger's seat of the vehicle 100. The user may input a control command of the head unit 110 in such a manner that the head unit inputter 112 is turned, pressed, or pushed upward, downward, leftward or rightward.

The vehicle communicator 120 is a module for supporting data exchange with an external device. For example, the vehicle communicator 120 may be paired with an imaging device 200 for image capturing, such as a portable terminal, and receive a connectivity function of the imaging device 200. For example, the vehicle communicator 120 may include a wireless fidelity (Wi-Fi) module connected to a local area network (LAN) through an access point, a USB module, a Bluetooth module for performing a one-to-one communicator with a single external device or performing a one-to-many communicating with a small number of external devices, a broadcast signal receiving module for receiving a digital broadcast signal, and a position information receiving module for receiving position information of the vehicle 100 from a satellite or the like.

In addition, the vehicle communicator 120 may be connected to an external device using a GSM/3GPP-based communication system (GSM, HSDPA, LTE Advanced), a 3GPP2 system communication system (CDMA or the like), or a wireless communication protocol, such as WiMAX.

In addition, the vehicle communicator 120 may transmit and receive data to and from GPS satellites to transmit and receive the current position information of the vehicle 100 to and from the GPS satellite, or transmit and receive map information to and from a server located at a remote site.

In addition, the vehicle communicator 120 may be connected to an external device to transmit and receive multimedia data. In detail, the vehicle communicator 120 may be connected to a mobile terminal located adjacent to the vehicle 100 or a server located at a remote site, to transmit and receive multimedia data to/from the mobile terminal or the server. For example, the vehicle communicator 120 may be connected to the imaging device 200 to receive image information about an image captured by the imaging device 200.

The vehicle controller 130 may execute a command to operate a module installed in the vehicle 100 using the information received from the imaging device 200. For example, the vehicle controller 130 may determine the position of a home device in an image captured by the imaging device 200 on the basis of image information of the home device received from the imaging device 200 paired with the head unit 110.

In addition, the vehicle controller 130 may display an image on the head unit display 111 on the basis of the image information received from the imaging device 200 connected thereto via Wi-Fi, USB, or Bluetooth. Here, the vehicle controller 130 may control the head unit display 111 to display a selection area of the home device in the image.

In addition, the vehicle controller 130 may execute a command to operate a module installed in the vehicle 100 according to a user command input through the head unit inputter 112. For example, upon receiving a selection command for at least one of the home devices displayed on the image, the vehicle controller 130 may control the head unit display 111 to display a menu related to the selected home device, or may control the vehicle communicator 120 to transmit a control signal for controlling the selected home device.

The vehicle controller 130 includes a memory 131 configured to store data regarding an algorithm for controlling the operations of components in the vehicle 100 and a program representing the algorithm, and a processor 132 for performing the above-described operation using the data stored in the memory 131. In this case, the memory 131 and the processor 132 may be implemented as separate chips. Alternatively, the memory 131 and the processor 132 may be implemented as a single chip.

The imaging device 200 is a user external device paired with the head unit 110, and may include at least one of a cellular phone (a PCS phone), a smart phone, a personal digital assistant (PDA), a portable multimedia player (PMP), a laptop computer, a digital broadcasting terminal, a netbook, a navigation system, a slate PC, a tablet PC, a camera, and a video image capturing device. In addition, the imaging device 200 may include various Internet-based multimedia devices for capturing an image.

The imaging device 200 may communicate with the vehicle communicator 120 using various types of data using an application or a program.

In addition, the imaging device 200 may perform an iris recognition function or a camera function, and may image a surrounding space by performing the camera function, and generate image information as a result of the imaging.

Referring to FIG. 2, the imaging device 200 includes an imager 210, an imaging device communicator 220, and an imaging device controller 230.

The imager 210 may be implemented as a camera that captures an image of a surrounding space of the image device 200 to generate image information.

The imager 210 may be implemented as a panoramic camera or a 360-degree camera to generate a landscape around the imaging device 200 as a single space image.

The space image may refer to an image of a user space in which a home device is provided.

The space image may include a panorama image obtained by continuous image inputs, and a general image obtained by intermittent image inputs.

Image information generated by the imager 210 may be transmitted to the vehicle 100 through the imaging device communicator 220.

The imaging device communicator 220 may transmit the image information generated by the imager 210 to the vehicle 100 or may transmit various types of information generated by the imaging device controller 230 to the vehicle 100.

In addition, the imaging device communicator 220 may be connected to one or more home devices via a wired/wireless communication network.

The imaging device communicator 220 may include one or more imaging device antennas (not shown) and a microprocessor (not shown), and the microprocessor may measure the strengths and phases of received signals received from one or more home devices by the imaging device antennas, and transmit the measured strengths and phases of the received signals to the imaging device controller 230. The microprocessor of the imaging device communicator 220 and the imaging device controller 230 may be combined in a single unit so that the process of measuring the strength and phase of the received signal may be implemented in software. The method of measuring the strength and phase of the received signal is a technology well-known in the art, and thus detailed description thereof will be omitted.

The imaging device communicator 220 is a component for supporting data exchange with an external device, such as the vehicle 100 or a home device. The configurations of the imaging device communicator 220 for communicating with the vehicle 100 are identical to those of the vehicle communicator 120 of the vehicle 100 as described above, and thus detailed description thereof will be omitted.

The imaging device controller 230 is a component for controlling the overall operations of the imaging device 200, and may control the operations of various modules, devices, and the like embedded in the imaging device 200. According to the embodiment, the imaging device controller 230 may be operated by a processor built in the imaging device 200, to generate a control signal for controlling various modules, devices, and the like embedded in the imaging device 200 so that the operation of each of the above-described components may be controlled.

The imaging device controller 230 may control the imager 210 to capture an image of the surrounding space and generate image information, and may control the imaging device communicator 220 to transmit the image information generated by the imager 210 to the vehicle 100.

In addition, the imaging device controller 230 may determine the positions of one or more home devices disposed around the imaging device 200 on the basis of the image information generated by the imager 210 and the strengths and phases of transmission signals of the home devices measured by the imaging device communicator 220, and may control the imaging device communicator 230 to transmit the determined position information together with the image information to the vehicle 100.

In addition, the imaging device controller 230 may transmit the measured information about the strength and phase of the received signal to the vehicle 100 such that the vehicle 100 determines the position of the home device, rather than directly determining the position of the home device on the basis of the strength and phase of the received signal. However, for the sake of convenience in description, the following description will be made by a way of an example that the imaging device controller 230 directly determines the position of the home device on the basis of the strength and phase of the received signal and transmits the position information to the vehicle 100.

The imaging device controller 230 may identify one or more home devices through image analysis on a space image obtained through the imager 210 and may match the determined position information of the home device and the identified home device in the space image. The matching information may be transmitted to the vehicle 100 through the imaging device communicator 230, but the present disclosure is not limited thereto. For example, the vehicle 100 may directly perform image analysis and matching on the basis of the positional information and the space image. For the sake of convenience in description, the following description will be made by way of an example in which the vehicle controller 130 of the vehicle 100 receives positional information and image information from the imaging device 200, and performs image analysis and matching.

The method of identifying a home device through image analysis may be implemented in generally known technologies, such as determining the color and shape in a space image, and detailed description thereof will be omitted.

The imaging device controller 230 includes a memory 231 configured to store data regarding an algorithm for controlling the operations of components in the image device 200 and a program representing the algorithm, and a processor 232 for performing the above-described operation using the data stored in the memory 231. In this case, the memory 231 and the processor 232 may be implemented as separate chips. Alternatively, the memory 231 and the processor 232 may be implemented as a single chip.

It would be understood by those skilled in the art that at least one component may be added or omitted to correspond to the performances of the components of the vehicle 100 and the imaging device 200 shown in FIGS. 1 and 2, and the mutual positions of the components may be changed to correspond to the performance or structure of the system.

Some of the components shown in FIGS. 1 and 2 may refer to a software component and/or a hardware component, such as a Field Programmable Gate Array (FPGA) and an Application Specific Integrated Circuit (ASIC).

Hereinafter, a method of determining the positions of one or more home devices by the imaging device 200 according to an embodiment will be described with reference to FIGS. 3 to 6.

Figure 3:
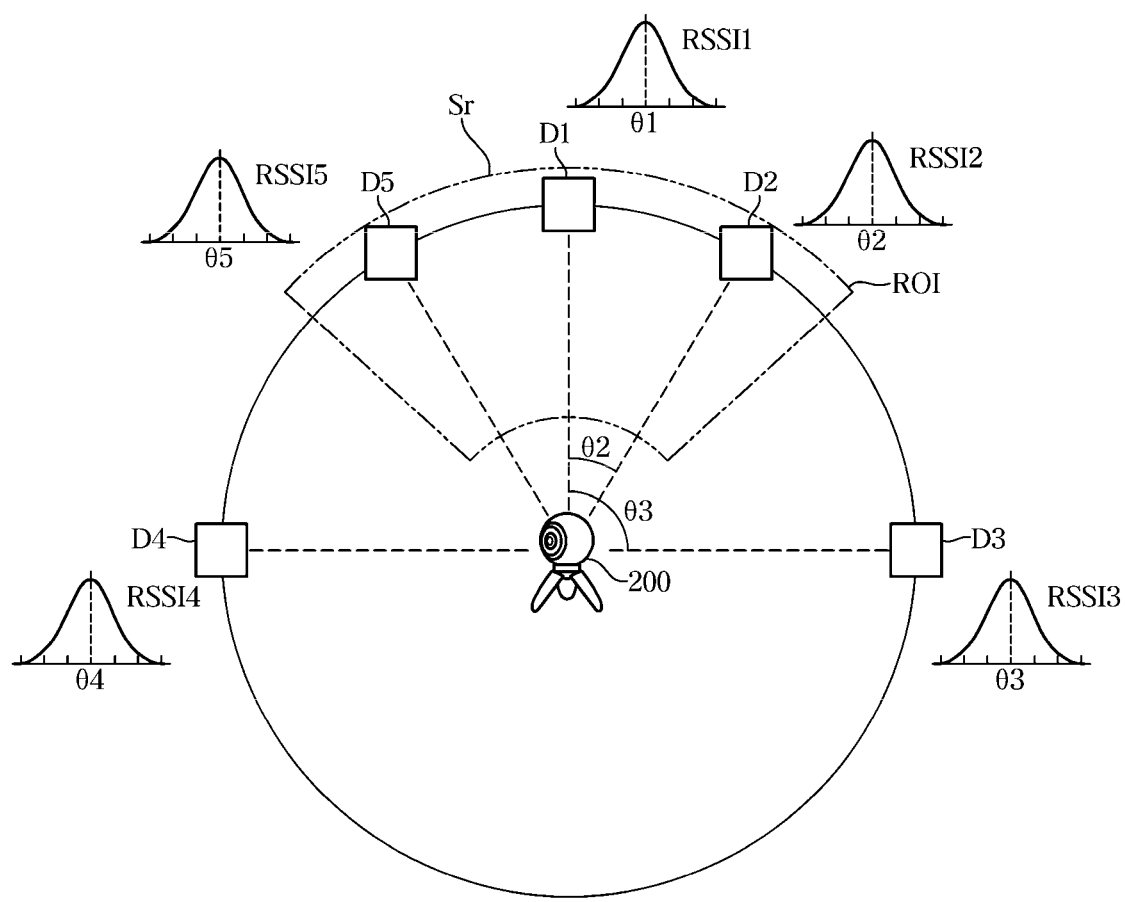
FIG. 3 is a layout diagram between the imaging device and one or more home devices according to an embodiment.
Figure 4:
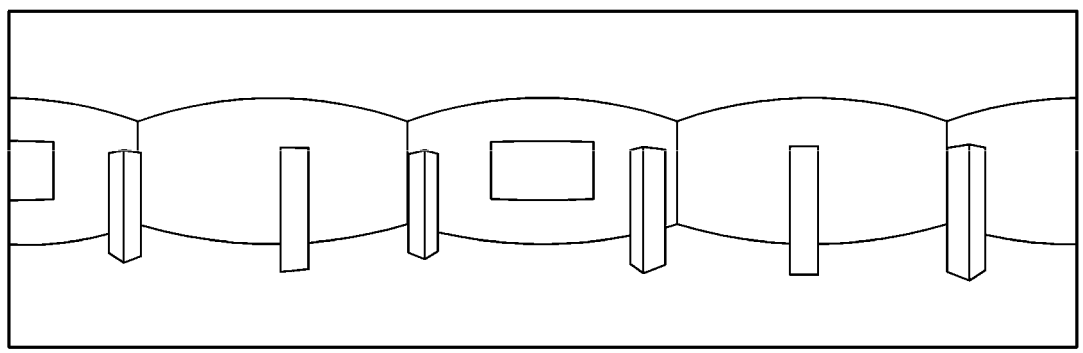
FIG. 4 is an exemplary view illustrating a space image obtained by the imaging device.
Figure 5:
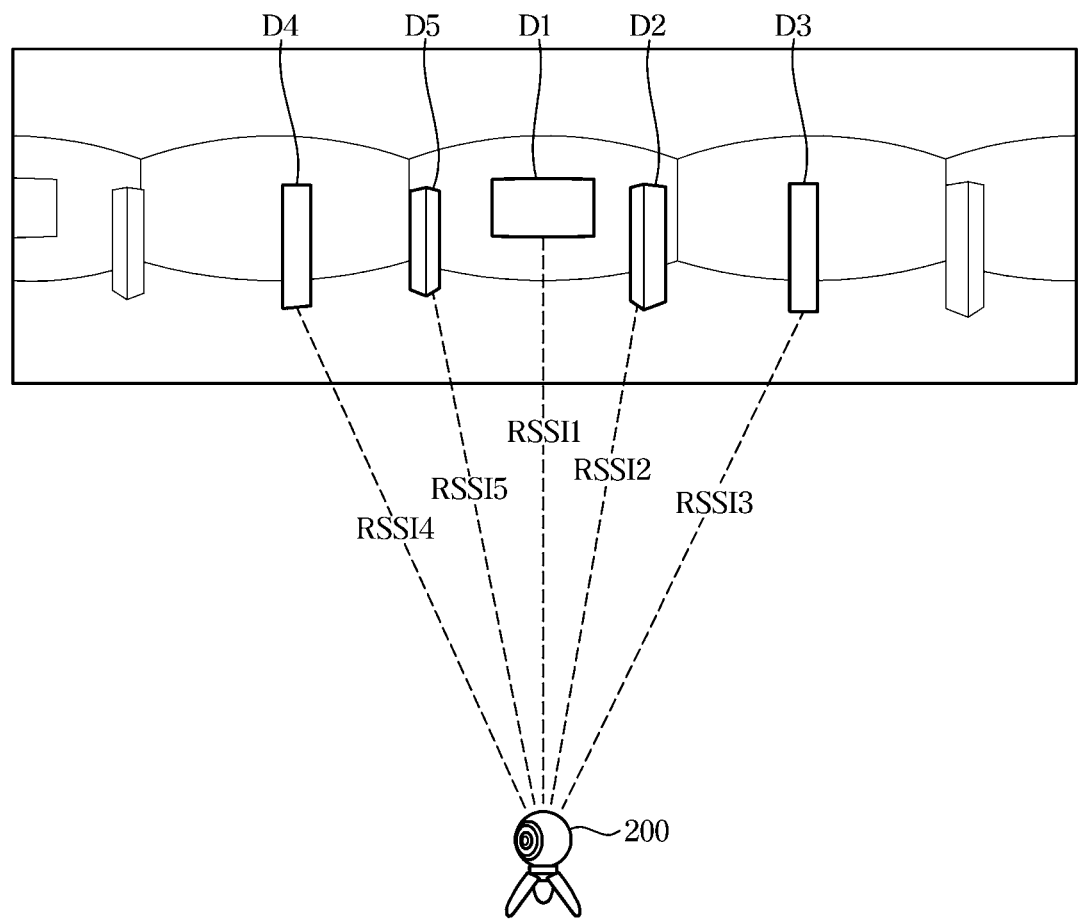
FIG. 5 is a view for describing a process of determining the positions of the home devices by the imaging device and identifying the home device by the vehicle.
Figure 6:
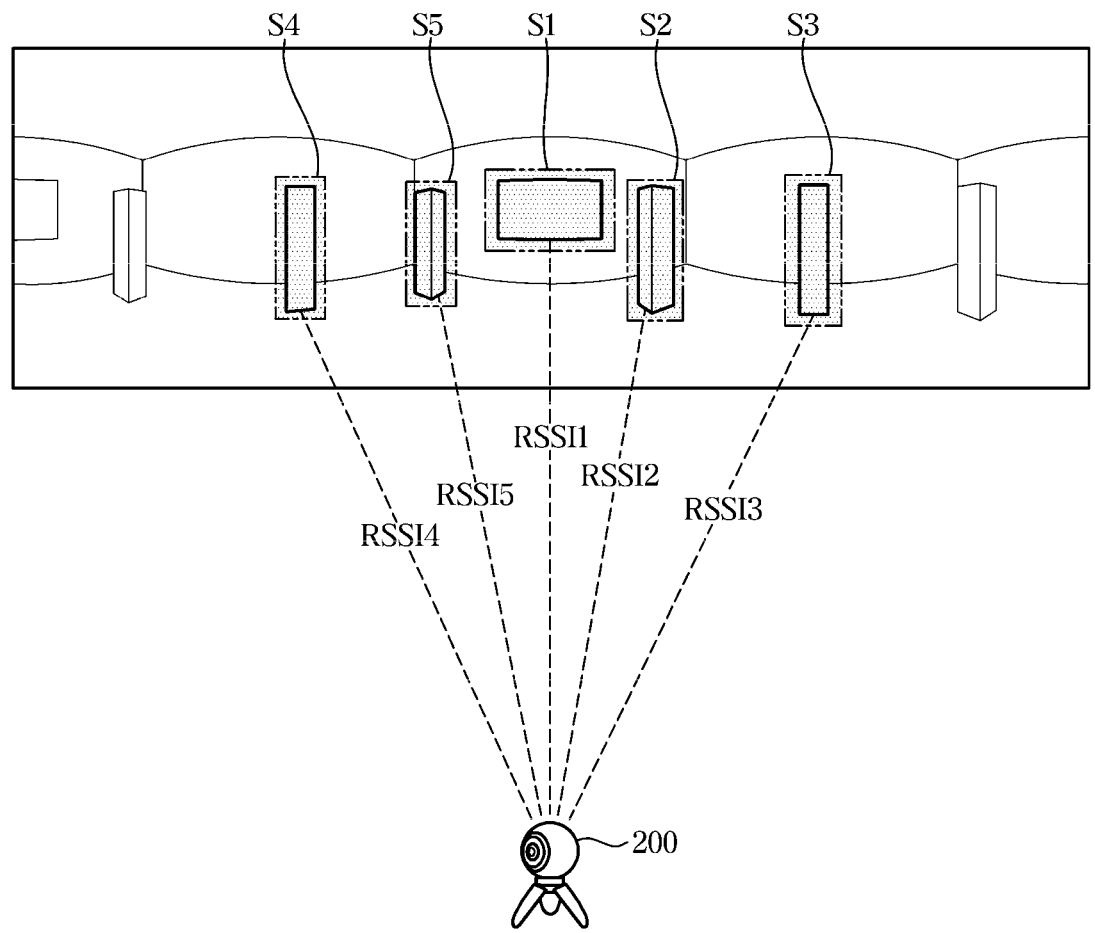
FIG. 6 is a view for describing a process of generating a selection area for an identified home device.

FIG. 3 is a layout diagram between the imaging device and one or more home devices according to an embodiment, FIG. 4 is an exemplary view illustrating a space image obtained by the imaging device, FIG. 5 is a view for describing a process of determining the position of a home device by the imaging device and identifying the home device by the vehicle, and FIG. 6 is a view for describing a process of generating a selection area for a identified home device.

Referring to FIGS. 3 and 4, when a plurality of home devices D1 to D5 are disposed around the imaging device 200 according to the embodiment, the imager 210 of the imaging device 200 may obtain a space image of a surrounding space in which the plurality of home devices D1-D5 are disposed, as shown in FIG. 4. The space image may include an image of a region of interest (ROI) displayed on the head unit display 111 of the vehicle 100 at a later time.

The imaging device communicator 220 of the imaging device 200 may receive signals from the plurality of home devices D1 to D5 and measure the strengths RSSI1 to RSSI5 of the respective received signals. In addition, the imaging device communicator 220 measures phases $\theta1$ to $\theta5$ (hereinafter referred to as "phases of the received signals") at points where the strengths of the signals RSSI1 to RSSI5 are the greatest, and transmits the measured strengths RSSI1 to RSSI5 and the measured phases $\theta1$ to $\theta5$ to the imaging device controller 230.

Referring to FIG. 5, the imaging device controller 230 may determine the positions of the home devices D1 to D5 on the basis of the strengths RSSI1 to RSSI5 and the phase $\theta1$ to $\theta5$ of the received signals of the plurality of home devices D1 to D5.

The imaging device controller 230 may control the imaging device communicator 220 to transmit the position information of the home devices D1 to D5 and the image information of the space image obtained by the imager 210 to the vehicle 100.

The vehicle controller 130 of the vehicle 100 may receive the position information and the image information of the home devices D1 to D5 from the imaging device 200 through the vehicle communicator 120, and the vehicle controller 130 may identify the plurality of home devices D1 to D5 in the space image through image analysis. Then, the vehicle controller 130 may match the position information of the determined home devices D1-D5 and the home devices D1 to D5 identified in the space image.

Referring to FIG. 6, the vehicle controller 130 may extract edge boundaries of the home devices D1 to D5 in the space image through image analysis, and generate selection areas S1 to S5 including the edge boundaries, which allows the user to select the home devices D1 to D5, in the space image.

The selection areas of the home devices D1 to D5 may each be provided in a size equal to or larger than the edge boundary to include the edge boundary, while being separated and distinguished from each other.

Figure 7:
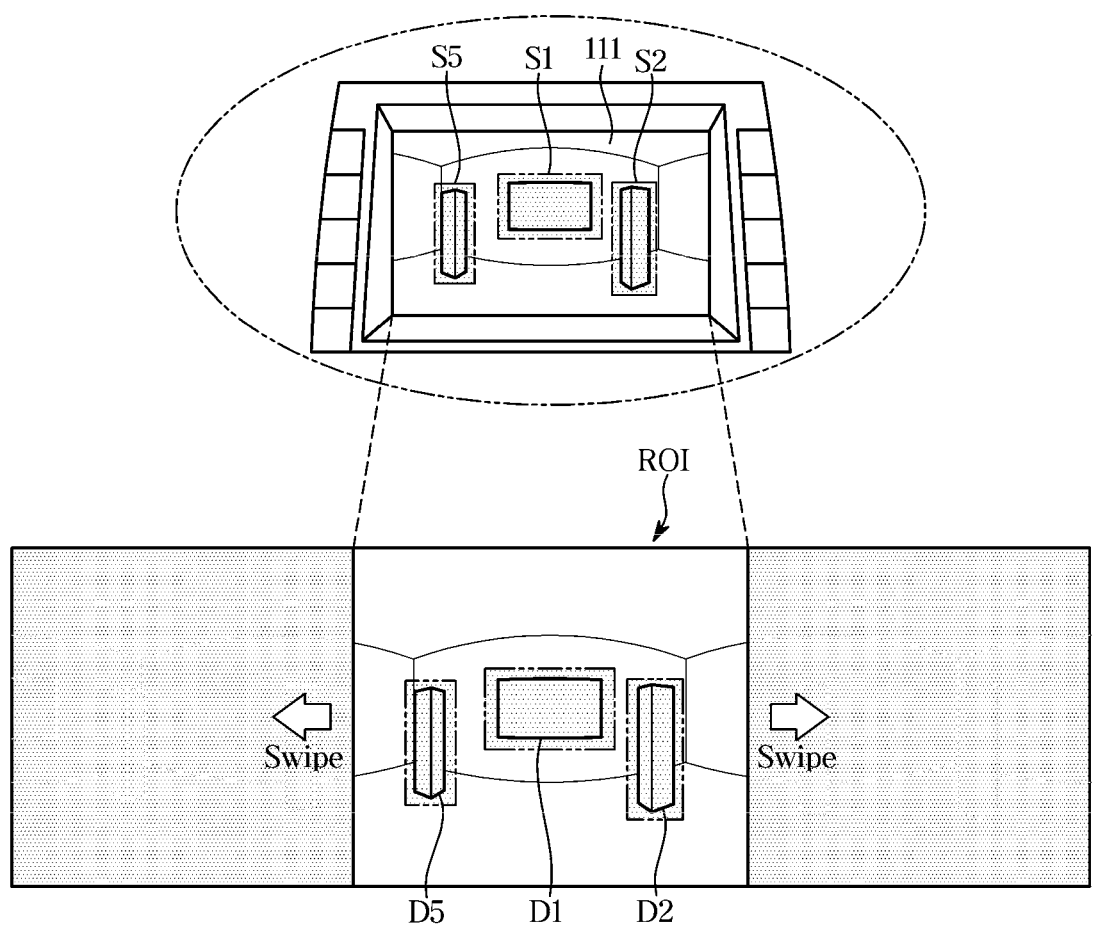
FIG. 7 is a view illustrating selection areas of home devices displayed on a head unit display of the vehicle.
Figure 8:
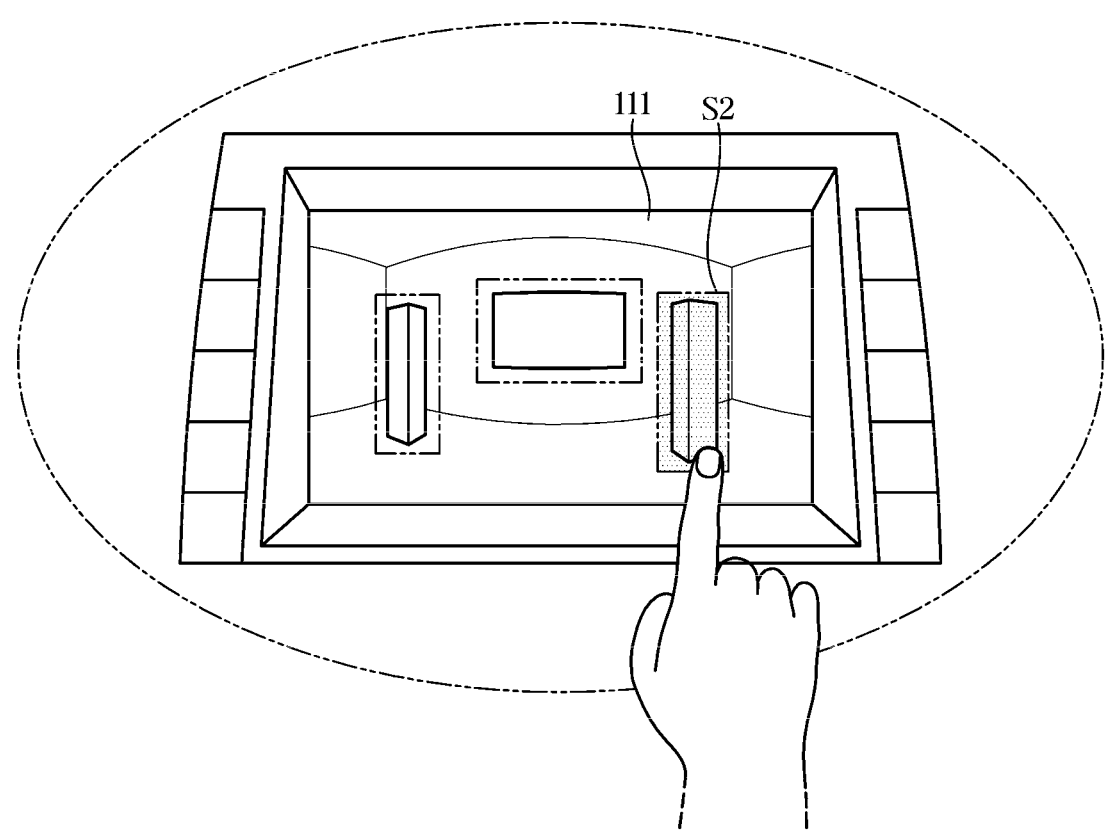
FIG. 8 is a view for describing a process of selecting a selection area through a touch input.
Figure 9A:
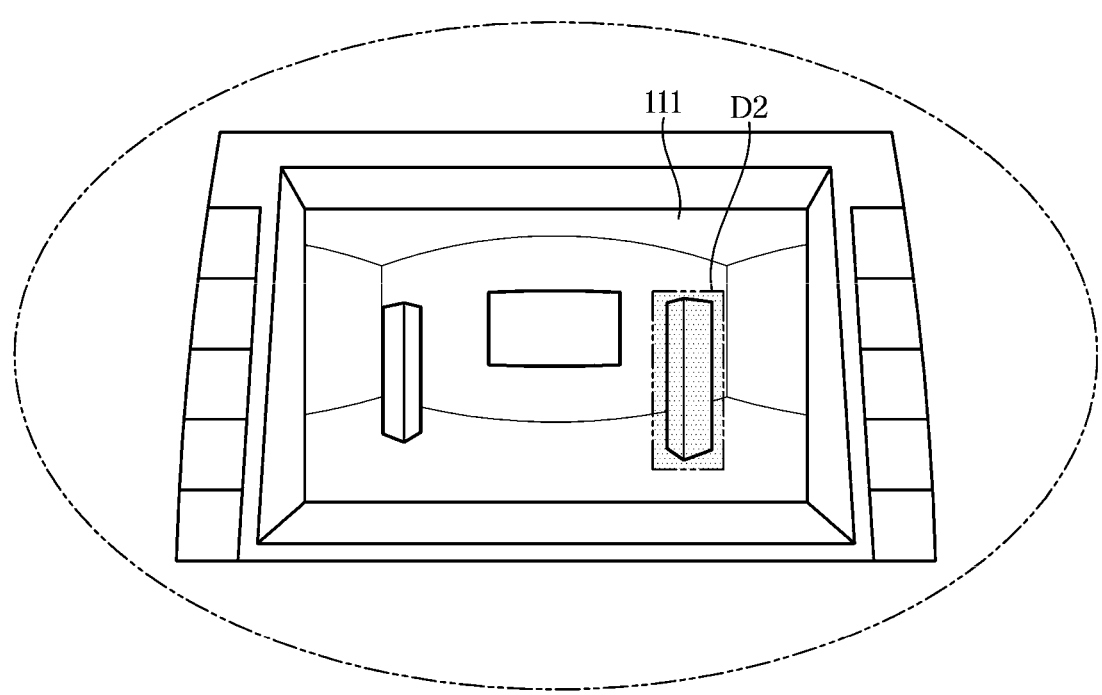
FIG. 9A and FIG. 9B is a view for describing a process of selecting a selection area through another manipulation device.
Figure 9B:
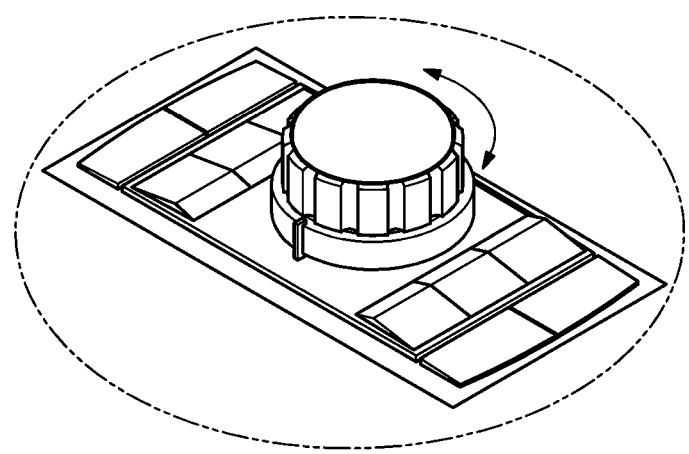

FIG. 7 is a view illustrating selection areas of home devices displayed on a head unit display of the vehicle, FIG. 8 is a view for describing a process of selecting a selection area through a touch input, and FIG. 9A and FIG. 9B is a view for describing a process of selecting a selection area through another manipulation device.

Referring to FIG. 7, a partial image ROI of a space image may be displayed on the head unit display 111 of the vehicle 100, and the partial image ROI displayed on the head unit display 111 may be selected by a user's input through the head unit inputter 112.

For example, as shown in FIG. 7, a user may select a partial image ROI of a space image by performing a swipe input on the head unit display 111 provided to receive a touch input.

The touch input may include a swipe, a drag, a tap, and other types of touches input by a user and is not limited, as long as it can be implemented by a user's direct touch on a display or the like.

Selection areas S1 to S3 of the one or more home devices D1, D2, and D5 may exist in a partial image ROI displayed on the head unit display 111.

The user may select the selection area S2 of a certain home device displayed on the head unit display 111 through a touch input as shown in FIG. 8, or may select the selection area S2 of the home device by a dial turning manipulation or a button manipulation as shown in FIG. 9A and FIG. 9B. The selecting of a selection area of a certain home device may be performed through other various manipulations.

As described above, when the selection area of the home device is designated, the vehicle controller 130 may control the head unit display 111 to output an image for controlling the selected home device.

Figure 10:
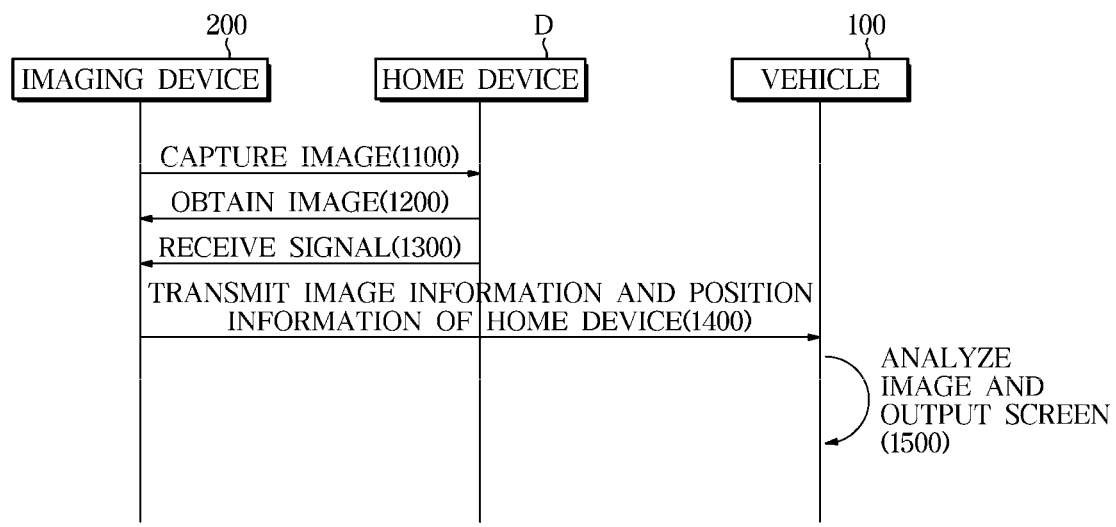
FIG. 10 is a signal flowchart for describing a signal transmission/reception process between the vehicle, the imaging device, and the home device according to an embodiment.

Hereinafter, a method of controlling the vehicle 100 according to an embodiment will be described with reference to FIG. 10. FIG. 10 is a signal flowchart for describing a signal transmission/reception process between the vehicle, the imaging device, and the home device according to an embodiment.

First, the imaging device 200 captures an image of a surrounding area of the imaging device 200 (at 1100), and obtains a space image of one or more home devices D existing in the surrounding area (at 1200).

The imaging device 200 receives signals from the one or more home devices D (at 1300), determines the positions of the one or more home devices D on the basis of information about the strengths and phases of the received signals, and generates position information.

Then, the imaging device 200 transmits the image information of the space image and the position information of the home device D to the vehicle 100 (at 1400). The vehicle 100 analyzes the image information of the space image to identify the one or more home devices D in the space image, and matches the home device D in the space image and the position information of the home device D on the basis of the position information of the home device D.

Then, the vehicle 100 may generate a selection area for selecting the home device D on the basis of the matched position information of the home device D, and display an image of a ROI of the space image together with the selection area of the home device D included in the ROI (at 1500).

It would be understood by those skilled in the art that at least one component may be added or omitted to correspond to the performances of the components of the above described vehicle 100 and the imaging device 200, and the mutual positions of the components may be changed to correspond to the performance or structure of the system.

As is apparent from the above, the vehicle and the method of controlling the same can improve the user convenience and the intuitiveness by allowing a vehicle to provide a graphic user interface that is similar to a real space of a user.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

The invention claimed is:

1. A vehicle comprising:
   a vehicle communicator configured to receive image information of a home device and position information derived on the basis of a signal transmitted by the home device;
   a display configured to display an image on the basis of the image information; and
   a vehicle controller configured to identify a selection area of the home device in the image on the basis of the image information and the position information,
   wherein the display displays the identified selection area.

2. The vehicle of claim 1, wherein the vehicle communicator receives image information about a space image.

3. The vehicle of claim 2, wherein the vehicle controller controls the display to display a partial image of the space image.

4. The vehicle of claim 3, further comprising an inputter configured to receive a designation of the partial image of the space image from a user.

5. The vehicle of claim 4, wherein the inputter includes a touch panel, and receives the designation of the partial image through a touch input.

6. The vehicle of claim 1, wherein the vehicle communicator receives signal strength information and phase information of the home device as the position information, and
   the vehicle controller determines a position of the home device on the basis of the signal strength information and the phase information.

7. The vehicle of claim 6, wherein the vehicle controller determines a phase at a point in which the home device has greatest signal strength, to be a phase of the home device.

8. The vehicle of claim 1, wherein the vehicle controller extracts an edge boundary of the home device on the basis of the image information and generates the selection area including the edge boundary.

9. The vehicle of claim 1, wherein the vehicle controller identifies the home device in the image and matches the identified home device and the position information.

10. The vehicle of claim 1, wherein the display receives a touch input to receive a designation of the selection area from a user.

11. A method of controlling a vehicle, the method comprising:
receiving image information of a home device and position information derived on the basis of a signal transmitted by the home device;
displaying an image on the basis of the image information; and
identifying a selection area of the home device in the image on the basis of the image information and the position information,
wherein the displaying of the image includes displaying the identified selection area.

12. The method of claim 11, wherein the receiving of the image information and the position information includes receiving image information about a space image.

13. The method of claim 12, wherein the displaying of the image includes, before the displaying of the identified selection area, controlling a display to display a partial image of the space image.

14. The method of claim 13, wherein the displaying of the image includes, before the controlling of the display, receiving a designation of the partial image of the space image from a user.

15. The method of claim 14, wherein the receiving of the partial image includes receiving the designation of the partial image through a touch input on an inputter implemented as a touch panel.

16. The method of claim 11, wherein the receiving of the image information and the position information includes:
receiving signal strength information and phase information of the home device as the position information,
wherein the identifying of the selection area includes determining a position of the home device on the basis of the signal strength information and the phase information.

17. The method of claim 16, wherein the determining of the position of the home device includes determining a phase at a point in which the home device has greatest signal strength, to be a phase of the home device.

18. The method of claim 11, wherein the identifying of the selection area includes extracting an edge boundary of the home device on the basis of the image information and generating the selection area including the edge boundary.

19. The method of claim 11, wherein the identifying of the selection area includes identifying the home device in the image and matching the identified home device and the position information.

* * * * *